Feb. 26, 1963   L. A. COHN   3,078,584
DENTAL APPARATUS
Filed April 13, 1961   6 Sheets-Sheet 1

INVENTOR.
LOUIS ALEXANDER COHN.
BY
ATTORNEY.

Feb. 26, 1963  L. A. COHN  3,078,584
DENTAL APPARATUS
Filed April 13, 1961  6 Sheets-Sheet 2

INVENTOR.
LOUIS ALEXANDER COHN.
BY
ATTORNEY.

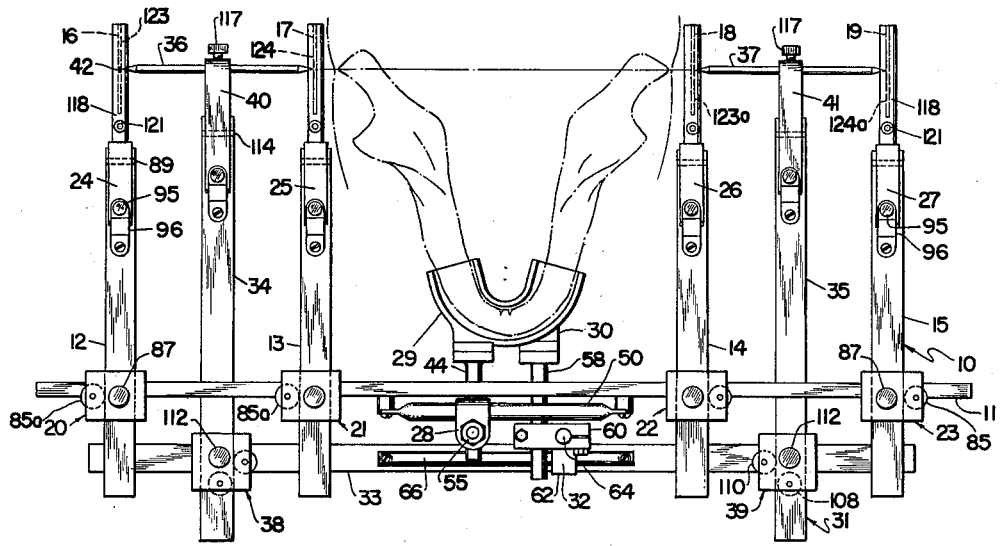

Feb. 26, 1963    L. A. COHN    3,078,584
DENTAL APPARATUS

Filed April 13, 1961    6 Sheets-Sheet 4

INVENTOR.
LOUIS ALEXANDER COHN.
BY

ATTORNEY

INVENTOR.
LOUIS ALEXANDER COHN.
BY

ATTORNEY.

3,078,584
DENTAL APPARATUS
Louis Alexander Cohn, 654 Madison Ave.,
New York, N.Y.
Filed Apr. 13, 1961, Ser. No. 102,727
16 Claims. (Cl. 33—174)

This invention relates to the determination of hinge axes of jaws, particularly for the purpose of enabling articulators to be accurately adjusted in the process of preparing dental restorations or sets of coacting plates.

The commonly employed method of locating the position of the lower jaw hinge for the above-mentioned purpose is to employ a conventional hinge bow mounted upon and movable with the lower jaw, and a stationary field-defining member coactively positioned relative to an indicator on the bow, the objective being to obtain two points, one on each side of the head, the assumption being that these points define the correct transverse mandibular or lower jaw axis. It is asserted by experts that the use of said conventional apparatus does not assure accurate axes determinations, various reasons for the inaccuracies having been advanced.

Prominent among the reasons given by one school of dental practitioners for the failure of said conventional apparatus is that the single line obtained by the determination of two points does not represent the true mandibular hinge axis. The proponents of the thesis of this school maintain that only by locating separate axes for the two laterally opposite condyles can the true pivotal characteristics of the jaw be determined. There has, indeed, been convincing evidence that the axes of the two condyles are not necessarily colinear. But regardless of the colinearity or lack of colinearity of the two axes, the method of determining the hinge characteristics of the jaw by obtaining one point at opposite sides of the head does not provide a basis for the accurate transfer of the jaw's hinge characteristics to an articulator.

Conventional frame or face bows for axes determinations generally comprise one bow having a crossbar carrying a bite supporting member and two adjustable arms at opposite ends of the bar, each arm carrying at the rear thereof an indicator member positioned in the region of the adjacent condyle, the arrangement being such that as the lower jaw is hingedly moved the two bow arms will move with it—the indicator member, or that portion thereof intercepting the projection of the axis, having imparted thereto a purely rotary or spinning motion. In one known device, the indicator members each consists of a wire mesh screen, there being affixed to the head of the patient adjacent each screen a plate (a field defining member) having thereon graph paper markings, the theory being that upon a sighting taken through the mesh openings, the position of the jaw axis will be indicated by that mesh aperture that does not move relative to the graph lines on the plate. Should such a point be determined, a pencil or other marking instrument is inserted through the axial mesh opening and the axial point marked on the plate. Two such points are located on opposite sides of the head, and their positions then transferred by special calipers to an articulator. In another known and more widely used device, the bow arms each carries a pointed stylus parallel to the crossbar, and supposedly parallel to the eyes or prominences, there being members in the form of "flags" or plates also covered with graph paper. Said flags are placed against the skin of the patient, the stylus-carrying arms and the stylus members being adjusted until their respective inner pointed ends can be made to spin against the graph paper. Such spinning positions of the stylus points are considered to be on the projection of the assumed condyle axis—the determination of the non-arcing spinning positions being by eye viewing of the position of each stylus point with respect to the graph lines.

The above-referred-to apparatus for axes determinations are incapable of effecting accurate findings both because of inherent shortcomings as well as because they require the use of human judgment factors which are readily subject to error. Where a flag or plate is used as a field or axis defining member, in a method for determining only one axial point on each side of the face, the located point is positioned on the member, and since that has thickness, the located point is spaced from the condyle. In such a determination, even if the method used is accurate, the finding is only true at the place of determination, that is, at the outer surface of the flag or plate. In an attempt to minimize the error resulting from flag thickness, it is the common pracitce to press the flag against the skin, the flag being removed after the stylus' spinning point has been located, to permit the skin to resume its natural contour. The end of each stylus is then painted and gently pressed against the skin to form a spot upon the skin. This procedure has failed to correct the inaccuracies of the aforesaid method, since almost invariably the flag cannot be in complete flush engagement with the skin. This may be due to asymmetrical facial contours, the prominence of the malar processes, concave depressed areas at the condylar region, a markedly tapering face, protruding ears or other individual facial characteristics that produce spaces between the flag and skin or otherwise prevent the proper placement of the flag against the skin. Moreover, the accuracy of the transfer of axis points from the flags to the skin may be adversely affected by head posture, skin folds, undetected muscular contractions of the ear or other facial movements which may cause change of skin position over the condylar area.

It is noteworthy that since, in the conventional method above referred to, only the inner end of the stylus is set for spinning movement, it is almost invariably the case that the outer end is moving along an arcuate path. Assuming that the located point on the flag is accurate, it is apparent that any movement of the stylus inwardly towards the face to effect a tattooing of the skin would be away from the axis, whereby the marked spot on the skin would be off the axis.

The aforesaid visual observation of the movement of the stylus presents great difficulties in the determination of the spinning position of its inner point. This is particularly true if the stylus is short, or if the outer end wobbles or has an arcuate movement. Furthermore, the slowness of rotation of the stylus corresponding to the relatively slow jaw movement, as well as the limited jaw opening, add to the difficulties of determining with certainty the exact spinning location of the inner stylus end.

Being aware of the aforesaid shortcomings of known techniques for axes determinations, and being cognizant, from my own extensive experience, of the need for extreme accuracy in condyle axes determinations, I have devised an apparatus and method that have none of the aforesaid disadvantages, and which are adapted to meet the exacting requirements of articular preparation from precise hinge axes measurements.

Specifically, among the objects of my invention is the provision of an apparatus and method for the accurate determination of two axial points on each side of the face, whereby a line connecting said points will be a true projection of the adjacent condyle axis. And in this aspect of my invention it is another object thereof to provide a pair of pin members adapted for adjustable coactive positioning with respect ot both mandibular and maxillary bite supporting members, said pin members being adjustably movable, so that they are each in longitudinal alignment with the true axis of the adjacent condyle.

It is also my objective to provide readily adjustable mandibular and maxillary bows, the former adjustably supporting said pin members in a manner to readily enable the respective opposite ends thereof to be separately located on the adjacent condyle axis, the latter adjustably supporting flag members that serve a double function, to wit, (1) facilitating the observation of the rotating action of the respective pin members, (2) being settable into axes indicating positions so as to enable a ready transfer of such positions to a suitable articulator.

Another object of my invention is to provide a relatively simple and readily usable apparatus having the features above mentioned.

Other objects, features and advantages of my invention will appear from the drawings and the description hereinafter given.

Referring to the drawings,

FIGURE 4 is a plan view of the members of FIGURES 2 and 3 shown in mutual relation and operatively in place.

FIGURE 5 is an enlarged plan view of that portion of the apparatus of FIGURE 4 positioned on one side of the head.

FIGURE 7 is a fragmentary side view, looking in the direction of arrows 7—7 of FIGURE 2, showing the adjustable coupling connection between the upper bow crossbar and one of its co-acting side arms.

FIGURE 7a is a fragmentary front view of FIGURE 7 looking in the direction of arrows 7a—7a.

FIGURE 8 is a fragmentary side view, looking in the direction of arrows 8—8 of FIGURE 3, showing the adjustable coupling connection between the crossbar of the lower bar member and one of its co-acting arms.

FIGURE 8a is a fragmentary front view of FIGURE 8 looking in the direction of arrows 8a—8a.

FIGURE 9 is an enlarged fragmentary section of FIGURE 2 taken along line 9—9, showing a side view of the adjustable clamp connecting the upper bow members and its coacting bite supporting member.

FIGURE 9a is a fragmentary front view of FIGURE 2 looking in the direction of arrows 9a—9a.

Figure 1:
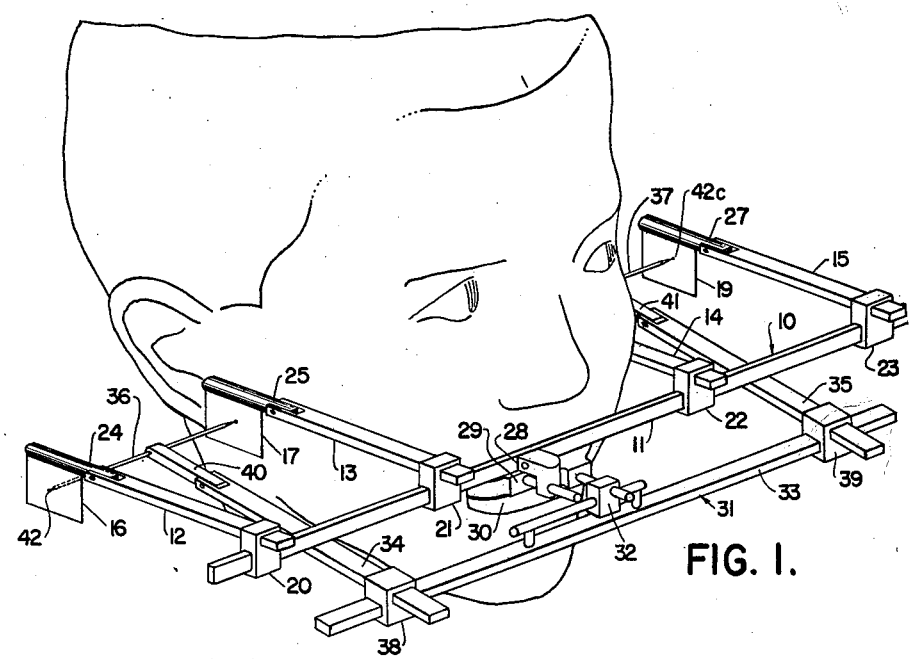
FIGURE 1 is a semi-schematic perspective view of the apparatus of my invention shown operatively in place.

The general concept of my invention can be gleaned from an examination of the schematic illustration of FIG. 1 showing the main components of my device operatively in position. There are two adjustable bows supported by two coactive bite supporting members, one bow carrying two axis locator pins on opposite sides of the head, and the other carrying two pairs of axis indicating members, each pair being coactively positioned with respect to one of said locator pins. More specifically, the upper or maxillary bow 10 comprises the crossbar 11 having adjustably mounted thereupon the four arms 12, 13, 14 and 15 supporting the respective axis indicating members or flags 16, 17, 18 and 19. Said arms are attached to said crossbar by the couplings 20, 21, 22 and 23 permitting mediolateral and anteroposterior adjustment of said arms, said arms also having thereon the ramus members 24, 25, 26 and 27 each pivotally movable in a vertical plane. Said flag members 16, 17, 18 and 19 are thus adjustable in all directions by manual manipulation, as will more clearly hereinafter appear. An adjustable clamp member 28 is attached to the upper bite supporting member 29, the latter being in coactive engagement with the lower bite supporting member 30, both of said bite supporting members (to be more fully hereinafter described) being properly positioned within the mouth in a manner well known to those skilled in the art.

The said lower bite supporting member 30 operatively supports the lower or mandibular bow 31, an adjustable clamp member 32 connecting said bite supporting member 30 to the crossbar 33 which adjustably carries the said arms 34 and 35 supporting the respective axis locator pins 36 and 37. The said arms 34 and 35 are attached to the crossbar 33 by the respective adjustable coupling members 38 and 39 permitting, as in the case of the aforesaid maxillary side arms, mediolateral and anteroposterior adjustments of the said mandibular side arms. The said latter arms also have thereon the respective ramus members 40 and 41 pivotally movable in a vertical plane, whereby said pins 36 and 37 may be adjustably manipulated in all directions.

In the practice of my invention by the apparatus above described, the crossbars 11 and 33 are positioned substantially parallel to the eyes or cheek prominences of the patient, the inner flags 17 and 18 being positioned in the regions of the respective adjacent condyles, the outer flags 16 and 19 being spaced from the respective inner flags sufficiently to accommodate therebetween the said respective pins 36 and 37. Upon opening and closing movements of the mandible and the corresponding movements of the mandibular bow arms 34 and 35, the opposite terminal ends of said respective pins will either spin or move in arcuate directions, the spinning occurring if a terminal end happens to be positioned on the true axis of the adjacent condyle, and the arcuate movement occurring when it is otherwise positioned—the latter condition almost invariably prevailing before the adjusting operations are made. In a manner to be fully explained herebelow, the pins are adjustably positioned until all arcuate movements of the opposite ends thereof—as well as all wobbling of the pins—no longer occur during the operative pivotal movement of the mandible, there being only a spinning of said ends. The flags are then operatively adjusted until their respective indicating holes—such as hole 42 in flag 16 (FIG. 1)—are each coincident with the adjacent end of the corresponding pin. Since the spinning ends of both pins indicate that they are each on the projection of the adjacent condyle axis, each pin is throughout its extent colinear with said adjacent axis. The lower bow, with the two pins thereof each defining a line which is colinear with the true axis of the adjacent condyle, is then used to transfer such axial positions to a suitable articulator.

Although the details of construction of my apparatus and the precise steps of the method of my invention are set forth below, it will be helpful at this point to note that axes determinations are taken first on one side of the face, and then independently on the other side. In my preferred method, the spinning point of the outer end of one of the locator pins is first determined, and then the adjacent flag moved to bring its indicator hole to the exact position of said spinning end—the flag being operatively fixed in that position. Then the spinning point is similarly obtained for the inner end of the last-mentioned pin, the adjacent inner flag being then moved to bring its indicator hole into coincidental relation to said inner spinning end, whereafter said inner flag is operatively fixed in that position.

Figures 9, 9A:
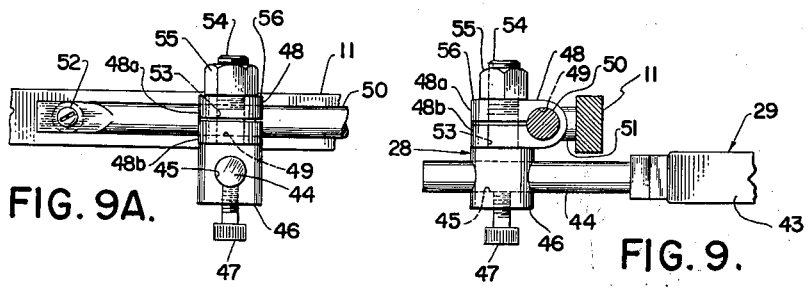

In the particular embodiment of my invention illustrated, the maxillary bite supporting member 29 comprises the tray 43 attached to the rod 44 which is adjustably mounted on the said clamp 28 to permit two-way adjustments. Said rod slidably extends through the horizontal passageway 45 in base 46 of clamp 28 (see FIGS. 9 and 9a), the set-screw 47, in threaded engagement with said base, being in abutment with rod 44 to hold it in a selected adjusted position. The upper split portion 48 of clamp 28 has the horizontal hole 49 therein through which extends the rail 50 held in spaced parallel relation to the crossbar 11 by the spacers 51 and fasteners 52. Extending upwardly from said base 46 through the apertured portion 53 of said split portion 48 is the stud 54, the nut 55 being in threaded engagement with the upper surface 56 of said split portion 48. Upon an operative release of said nut 55, the grip upon rail 50 by the upper and lower sections 48a and 48b will be reduced, in known manner, whereby the clamp 28 can be adjustably moved along said rail 50 to a selected position. By the adjustable clamp arrangement above described, the bite supporting member 29 can be properly adjustably positioned. It is to be noted that said rod 44 is offset laterally from the center of said tray 43, the objective being to prevent interference with the clamp 32 of the mandibular bow positioned therebeneath, FIG. 4 showing the non-interfering position of said clamp.

Figure 10:
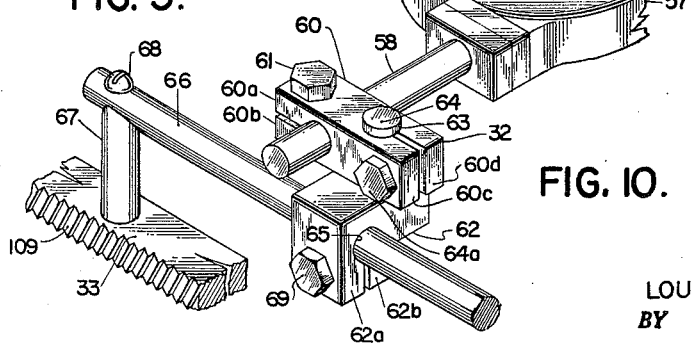
FIGURE 10 is a fragmentary perspective view of the adjustable connection between the lower bow member and its coacting bite supporting member.

The mandibular bite supporting member 30 comprises the tray 57 attached to the rod 58 which is adjustably mounted on the said clamp 32—the latter permitting three-way adjustments. Said rod 58 slidably extends through the horizontal passageway 59 of the upper split component 60 of clamp 32 (see FIG. 10), the screw 61 extending through the coacting upper and lower sections 60a and 60b to effect a releasable clamping action on rod 58, in known manner, whereby anteroposterior and rotary adjustments of the bite supporting member 30 may be made. Extending up from the lower split component 62 through the vertical hole 63 of the said upper component 60 is the post 64, the screw 64a extending through the coacting sections 60c and 60d of member 60 to effect a releasable clamping action on said post 64, thereby permitting both rotary and vertical adjustments of said bite supporting member 30 to be made. The said lower split component 62 has a horizontal passageway 65 through which the horizontal rail 66 slidably extends, said rail being held by spacing rods 67 above and in spaced relation to said mandibular crossbar 33, the screws 68 securing said rail to said spacing rods. Extending through and in threaded engagement with the coacting sections 62a and 62b of said split member 62 is the screw 69 to effect a releasable clamping action of member 62 on said rail 66, thereby permitting horizontal adjustment of said bite supporting member 30 to be made relative to crossbar 33. The clamp 32 thus enables the mandibular bow member 31 to be adjustably manipulated into any desired operable position with reference to the bite supporting member 30.

Figures 7, 7A:
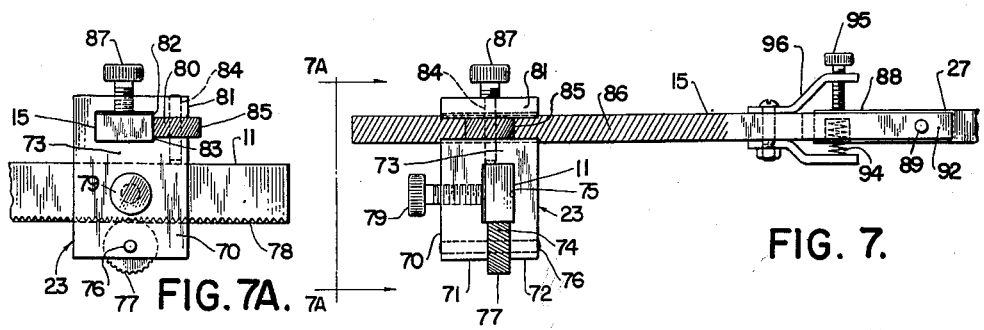
Figures 8, 8A:
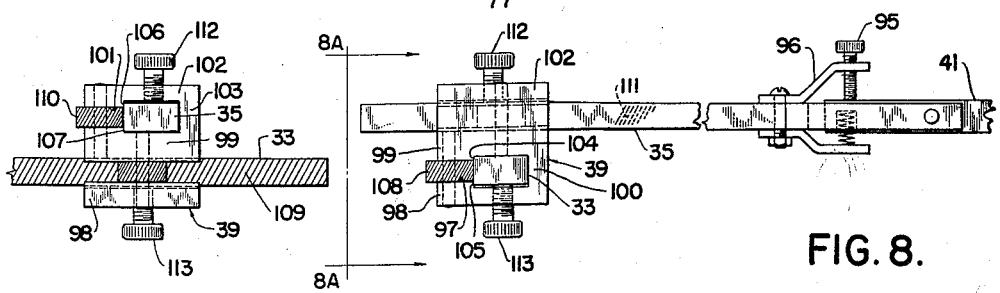
Figure 2:
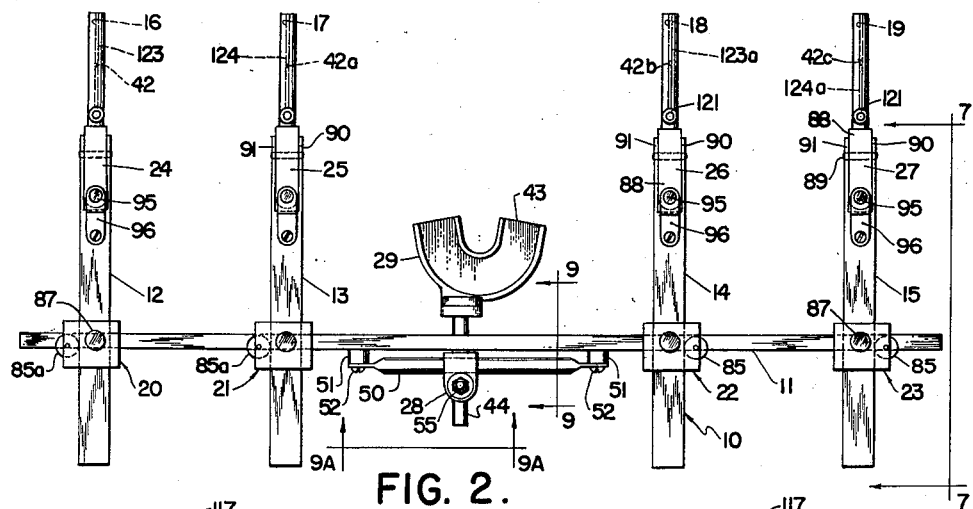
FIGURE 2 is a plan view of the upper bow member of my invention and its bite supporting member.
Figure 3:
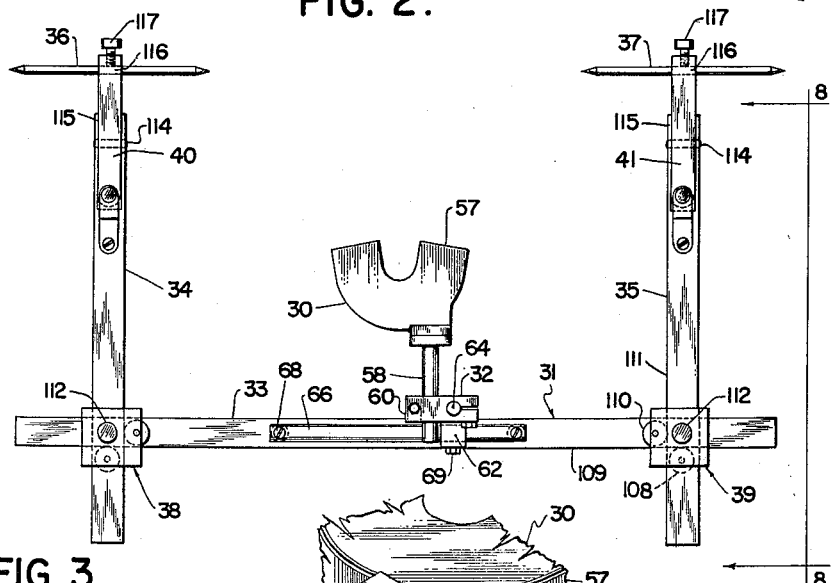
FIGURE 3 is a plan view of the lower bow member of my invention and its bite supporting member.

The couplings 20 and 21 on the maxillary bow 10 are identical, and the laterally opposite couplings 22 and 23 are also identical, the said two laterally opposite pairs of couplings being similar in construction but with certain parts reversed in position for right and left side operation, respectively, as will more clearly hereinafter appear. The coupling 23 will be described as illustrative of the construction of the said analogous couplings (see FIGS. 5, 7 and 7a). Slidably mounted over crossbar 11 is the lower channel member 70 comprising the opposite legs 71 and 72 and connecting wall 73 defining the vertically channelled portion 74 with the recessed track portion generally designated 75. Rotatably mounted on pin 76 supported by the two said legs 71 and 72 is the lower knurled adjusting wheel 77 in engagement with the knurled underside 78 of crossbar 11, the arrangement being such that the operative rotation of said wheel 77 will cause the coupling 23 to slidably move along said crossbar 11, the set screw 79, extending through leg 71, being operative to lock said coupling against movement when tightened, and to release said coupling for movement when loosened. A horizontally channelled portion 80 is formed by said wall 73 and the top wall 81, said last-mentioned walls being recessed at 82 and 83 to form a recessed track portion in slidable engagement with the arm 15. Rotatably mounted on pin 84 supported by said walls 81 and 73 is the upper knurled adjusting wheel 85 in operative engagement with the adjacent knurled side 86 of arm 15, the arrangement being such that the operative rotation of said wheel 85 will cause the said arm 15 to slidably move along said track portion within the channel 80, the set screw 87, extending down through said upper wall 81, being operative to selectively lock or release said arm 15, in the manner above described. As aforesaid, the said couplings 20 and 21 are similar in construction to coupling 23, except that the adjusting wheels 85a are positioned on the left side of the corresponding arms 12 and 13. It is thus apparent that through said couplings, the positions of the respective arms 12, 13, 14 and 15 can be adjusted, relative to the bite supporting member 29, forwardly, rearwardly and in laterally opposite directions.

Figure 6:
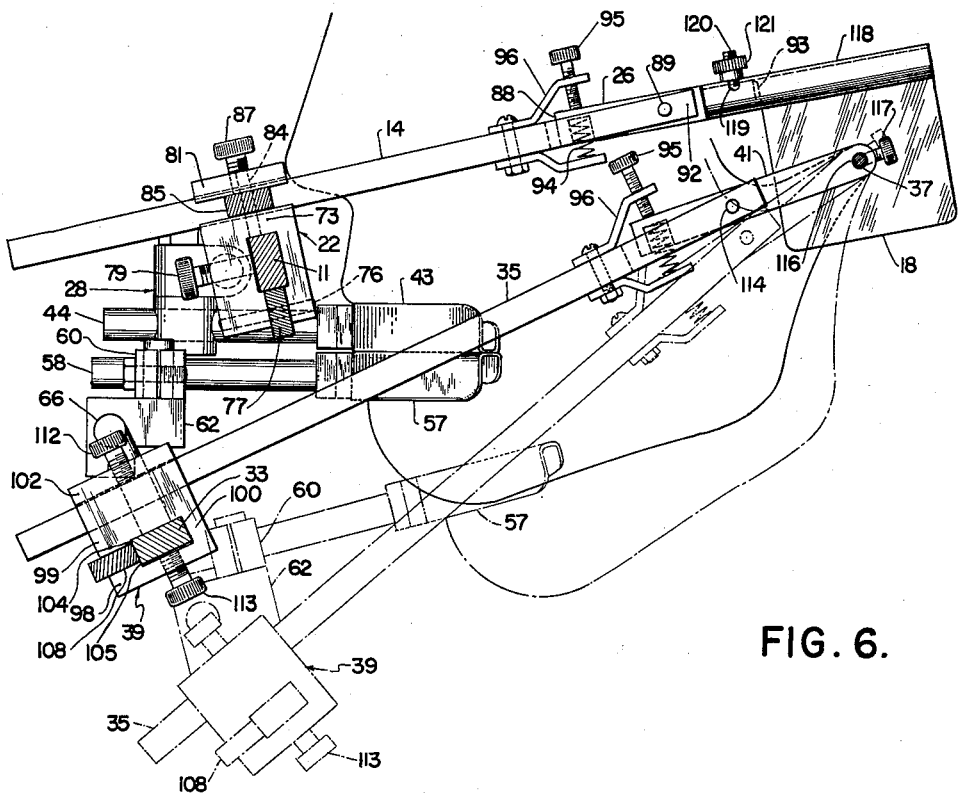
FIGURE 6 is a section of FIGURE 5 taken along line 6—6, the full lines showing the relative position of the parts of my apparatus when the jaw is closed, the dot-dash lines showing the lower bow member in its lower limiting position when the lower jaw is in a predetermined lowered position.

The said ramus members 24, 25, 26 and 27 are of identical construction, the forward portion 88 of each being pivotally supported at 89 between the two sections 90 and 91 of the bifurcated rear portion 92 of the arm—the rear portion 93 of each of said ramus members 24, 25, 26 and 27 constituting a boss upon which one of said flags is mounted, in a manner to be hereinbelow described. In the particular embodiment illustrated, an operatively supported spring 94, in engagement with the underside of said forward portion 88, urges the ramus arm upwardly, a set screw 95, adjustably supported by the bracket 96 affixed to the arm, engaging the upper surface of said forward portion 88 against the action of said spring. By an operative manual turning of said set screw 95, the corresponding ramus member (such as member 26 of FIG. 6), can be pivotally moved in a vertical plane to a selected position. By adjusting manipulations of the said coupling wheels 77 and 85, and the set screw 95, the ramus-supported flag—such as flag 18—can be brought to any desired operative position.

The mandibular bow couplings 38 and 39 are of similar construction, but with certain parts reversed for proper positioning on opposite sides of the head. The description of coupling 39 will, accordingly, be deemed sufficient to illustrate the construction of both of said last-mentioned couplings. The lower section of said coupling 39 has the channel 97 formed by the bottom wall 98, the intermediate wall 99 and the lower connecting wall 100; and the upper section of said coupling has the channel 101 formed by said intermediate wall 99, the top wall 102 and the upper connecting wall 103. The said bottom and intermediate walls are coactively recessed at 104 and 105 to slidably accommodate the crossbar 33; and the said top and intermediate walls are coactively recessed at 106 and 107 to slidably accommodate the arm 35. Adjusting wheel devices substantially like those of coupling 22 above described are employed, the rotatable knurled wheel 108 being in engagement with the adjacent knurled surface 109 of crossbar 33, and the rotatably mounted knurled wheel 110 being in engagement with the adjacent knurled surface 111 of the arm 35—the respective set screws 112 and 113, extending through the respective upper and lower walls 102 and 98, being in releasable locking engagement with the arm 35 and crossbar 33, respectively. The operative rotation of the wheel 108 will cause the entire coupling to slidably move laterally along the crossbar 33; and the operative rotation of the wheel 110 will cause the arm 35 to slidably move forwardly or rearwardly through the channel 101 of said coupling.

The ramus members 40 and 41 are adjustably mounted on their respective arms 34 and 35 in the manner of the above described pivotal mountings of said upper ramus members 24, 25, 26 and 27, each of said two lower ramus members having its forward portion disposed within and pivotally mounted at 114 upon the bifurcated rear terminal portion 115 of its arm. The rearmost portion of each of said ramus members 40 and 41 contains a bore 116 through which the corresponding pin extends, such as pin 37 of FIGS. 5 and 6—the set screw 117 releasably locking the pin against movement. This arrangement thus enables each of said pins 36 and 37 to be independently and fully adjustably positioned.

Figure 18:
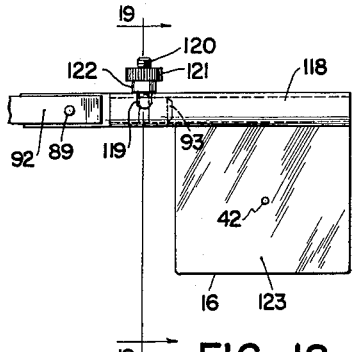
FIGURE 18 is a fragmentary side view of one flag member.
Figure 16:
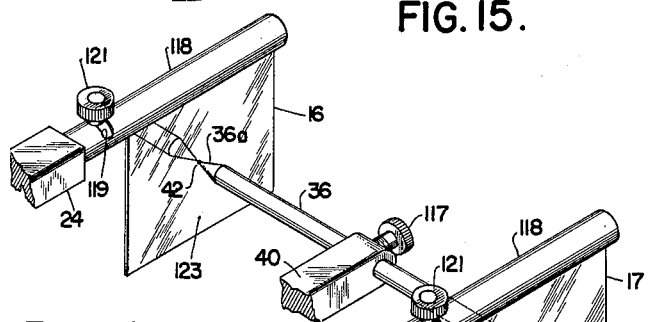
FIGURE 16 is a fragmentary perspective view of the pin and flags with the pin in its perfectly aligned axial position illustrated by the dot-dash lines of FIGURE 15.
Figure 19:
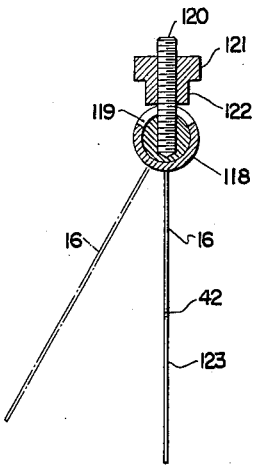
FIGURE 19 is an enlarged section of FIGURE 18 taken along line 19—19, the dot-dash lines showing the flag in an inclined position.

Each of said upper ramus members 24, 25, 26 and 27 has, as aforesaid, a boss 93 which is adapted to receive thereover the sleeve 11 of the flag member, such as flag member 16 (see FIGS. 18 and 19). Said sleeve 118 contains an apertured portion 119 through which the stud 120, attached to the said boss 93, extends. In threaded engagement with said stud 120 is the nut 121, the boss 122 of which is adapted for frictional engagement with portions of said sleeve flanking said apertured portion 119. Since said apertured portion 119 is of greater transverse width than the diameter of the stud 120, a loosening of the said nut will enable the flag to be rotated about said boss 93 within the limits of the said aperture's width (such as to the dot-dash position shown in FIG. 19), whereupon the flag can be held releasably locked in said rotated position by tightening said nut 121—for a purpose to be hereinafter set forth.

In the preferred form of the apparatus of my invention illustrated, the opposing surfaces 123 and 124 of flags 16 and 17, as well as the corresponding opposing surfaces 123a and 124a of the flags 18 and 19, are mirrored so that the reflections of the adjacent pin ends can readily be seen. As aforesaid, said flags have minute axis indicating holes therein, these being identified by the reference numerals 42, 42a, 42b and 42c for the respective flags 16, 17, 18 and 19. The pin terminals are pointed so as to accurately coact with the adjacent flag holes, the illustrations showing bevelled terminals 36a and 36b on axis locator pin 36, and bevelled terminals 37a and 37b on axis locator pin 37.

Figure 11:
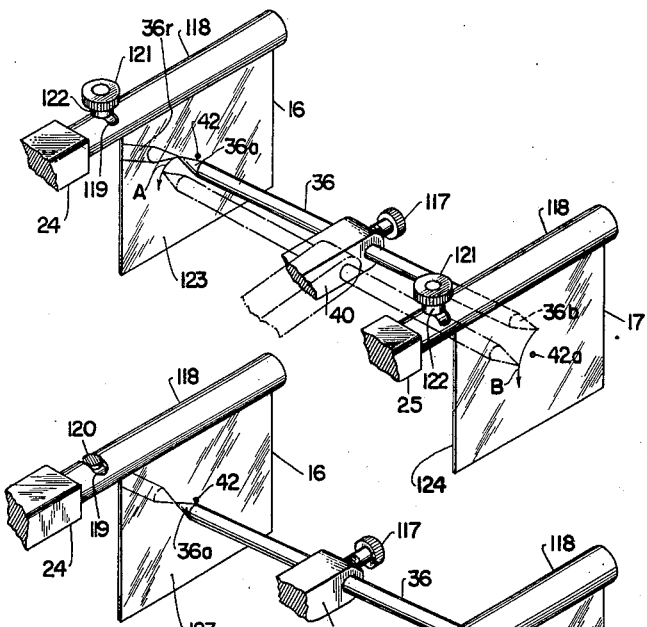
FIGURE 11 is a fragmentary perspective view of the axis locator pin and two axis indicating flags according to my invention, the parts being shown before adjusting steps have been taken, the pin being shown in full lines when the jaw is closed and in dot-dash lines when the jaw is open and the lower bow is in its predetermined low limiting position.

The preferred sequence of steps of adjusting the said pins and flags for axes determinations by my invention is illustrated in FIGS. 11 to 17. FIG. 11 shows a pin and its coacting flags in the original non-adjusted position of the apparatus, the full and dot-dash representations of the pin 36 showing the two extreme positions of the pin at two limiting positions of the lower jaw. It will be seen that the two pin terminals 36a and 36b are non-coincident with the respective flag holes 42 and 42a, the arcs of movement A and B being different, said two extreme pin positions being non-parallel, and the said pin terminals being in different spaced relation to said respective flags at the pin's said two positions. The pin is obviously wobbling between its two said extreme positions, and the terminals 36a and 36b moving through an arcuate path, indicating that neither of the terminals is on the mandibular pivotal axis. The angular reflection in the mirrored surfaces—such as reflection 36r in surface 123—readily reveals the non-spinning action of the pin.

Figure 12:
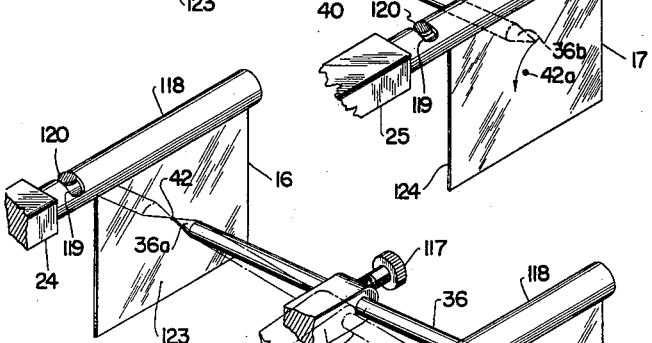
FIGURE 12 is a fragmentary perspective view of the components of FIGURE 11, showing the left terminal of the pin in its spinning and true axial position after the completion of the first adjusting step.

The next step is to operatively adjust the mounting 38 and the arm 34 with its ramus 40 as to bring the terminal 36a into a position where it will spin upon the opening and closing of the lower jaw. Such position is illustrated in FIG. 12 which shows the terminal 36a of the pin touching the flag 16, the spinning—that is, non-arcing action when attained—being readily observable by noting the reflection in the mirrored surface 123 during the operative pivotal movement of the lower jaw between its said limiting positions. In this position the hole 42 of the flag 16 is still non-coincident with the pin's terminal 36a; and the opposite terminal 36b is still moving through an arcuate path.

Figure 13:
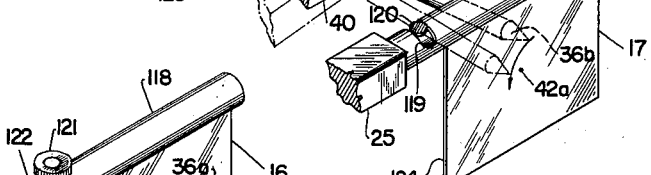
FIGURE 13 is a view like FIGURE 12, but showing the left flag operatively moved to a position where its axis indicating hole is congruent with the left terminal of the pin, the dot-dash lines showing the projected position of the pin and the arcuate movement of the right terminal of the pin when the mandible is moved to its lower limiting position.

FIG. 13 shows the pin 36 in the same position as in FIG. 12; but the flag 16 has been operatively moved so that the hole 42 is coincident with terminal 36a—this having been accomplished by operatively manipulating the coupling 20 and the arm 12 with its ramus 24. The flag 16 is then locked in this position by tightening the set screws of the mounting 20 corresponding to set screws 79 and 87 of FIG. 7. Hole 42 has now been fixed in a true axial position, whereby the pin 36 may now be operatively moved to locate the spinning position of the terminal 36b and thereby locate the true axial position for hole 42a of flag 17.

Figure 14:
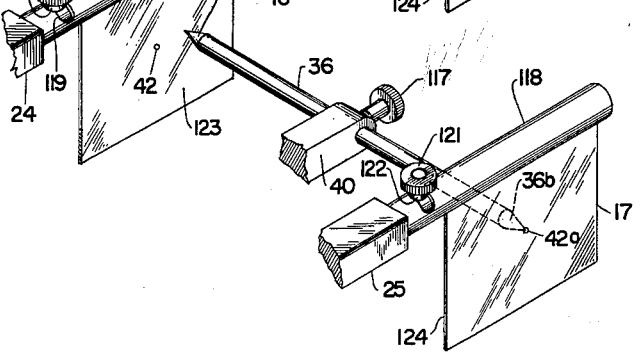
FIGURE 14 is a perspective view of the components of FIGURES 11–13, illustrating the position of the pin relative to the flags when the right terminal is in its true axial spinning position, the left terminal of the pin also being shown in its true axial position as illustrated in FIG. 13.

The next step is to bring said terminal 36b to its said spinning position, as illustrated in FIG. 14, this being done in the manner above described with reference to terminal 36a. As shown in the latter figure the flag 17 has also been moved, in the manner aforesaid, so that the hole 42a is coincident with pin terminal 36b, whereafter the flag 17 is fixed into that position.

Now both holes 42 and 42a are on the true axis of the adjacent condyle.

Figure 15:
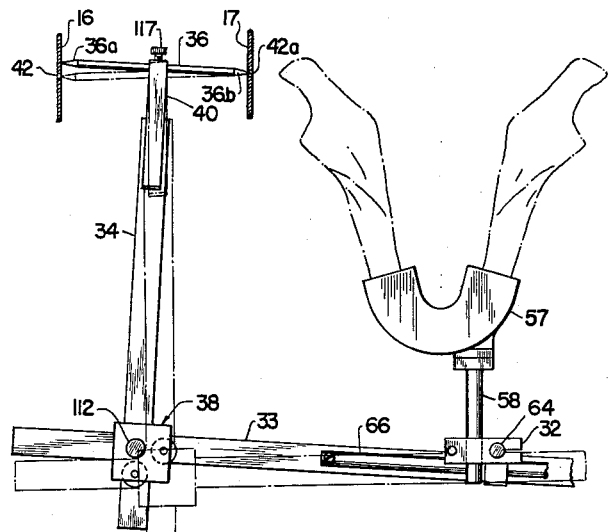
FIGURE 15 is a semi-schematic plan view of the device of my invention on one side of the head, the full lines showing the position of the lower bow and the pin relative to the flags in accordance with FIGURE 14, the dot-dash lines showing the position of said members after an operative shifting of the bow to bring the pin into alignment with the axis indicating holes in both flags.
Figure 17:
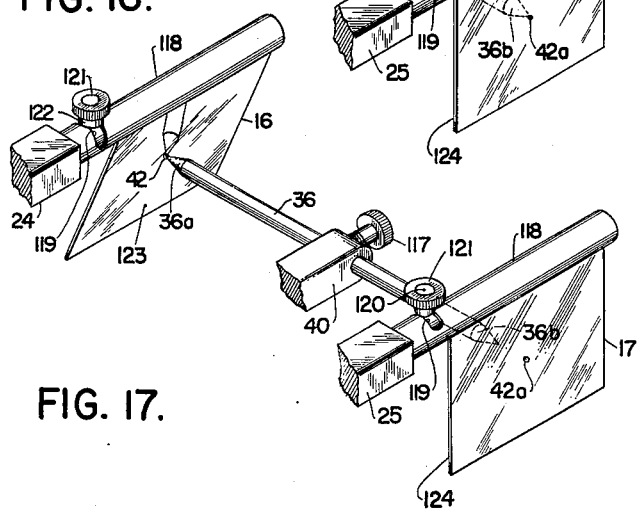
FIGURE 17 is a fragmentary perspective view of the pin and flags of FIGURE 16, but with one of the flags in an inclined position and the pin operatively shifted along its longitudinal axis into contacting engagement with the flag.

FIG. 15 schematically illustrates the next step—that of bringing the pin 36 into alignment with said axis indicating holes 42 and 42a, and thereby bringing the mandibular bow crossbar 33 in proper parallel relation to the axis defined by said holes. This is accomplished by suitable adjusting manipulations of clamp 32 connected to the lower bite supporting member 30, and, if necessary, by a loosening of set screw 117 and adjustably shifting the pin 36 to clear the flags during the adjustment. The dot-dash lines in FIG. 15 illustrate the located axial position of the pin, such position also being shown in FIG. 16. At this position a check can be made as to the accuracy of the axial positioning of pin 36, the accuracy being observable in the mirrored flag surfaces by noting the spinning action of both terminals 36a and 36b upon an opening and closing of the lower jaw. Still a further check can be effected by rotating the flag 16 to an inclined position, such as indicated in FIG. 17, and then loosening the screw 117 and sliding the pin 36 into contact with said flag. Upon a tightening of screw 117 and an operative movement of the lower jaw, the reflection in surface 123 will indicate whether or not the terminal 36a is spinning, as well as whether there is any oscillation of the pin towards and away from the flag. If the pin adjustments had been accurately made, the said terminal will be spinning and the pin not oscillating or wobbling. A similar check can be made for terminal 36b. The accurately determined axial positions of said opposite terminals indicate the pin is in linear alignment with the axis of the adjacent condyle, thereby also indicating that the holes 42 and 42a in the respective flags 16 and 17 define the position of such axis with respect to the two bite supporting members 29 and 30.

By the same procedure above described, the true condyle axis on the opposite side of the face can be determined, the locator pin 37 and indicating flags 18 and 19 being adjustably manipulated in the manner aforesaid. It is to be noted, however, that since both axes are either colinear or parallel, there will be no need to readjust the crossbar 33 by the step indicated in FIG. 15, inasmuch as said crossbar had previously been set in parallel relation to the prior located axis.

When both pins 36 and 37 have been operatively positioned and set for indicating the true axes for both condyles, the lower bow 31 is removed from the patient, and transferred to a suitable adjustable articulator to be used in the preparation of the required restoration or plates.

In the above description, the invention has been disclosed merely by way of example and in preferred manner; but obviously many variations and modifications may be made therein. It is to be understood, therefore, that the invention is not limited to any form or manner of practicing same, except in so far as such limitations are specified in the appended claims.

I claim:

1. In a dental apparatus for indicating the condyle axis on a side of the lower jaw, a mandibular bow member, means for attaching said member to the lower jaw, whereby said member will move with the operative movement of said lower jaw, an axis locator pin, adjustable means carried by said bow member and operatively supporting said pin on a side of said jaw in the region of the condyle thereof, a pair of spaced axis indicating members laterally flanking said pin, each of said indicating members having thereon an axis indicating marking, adjustable supporting means for said indicating members, said pin being adjustably moveable to a position at which the opposite ends thereof are in longitudinal alignment with said condyle axis, said indicating members being adjustably movable to positions at which their said respective indicating markings are in longitudinal alignment with said pin when the latter is in said position of longitudinal alignment with the condyle axis.

2. In a dental apparatus for indicating the condyle axis on the opposite sides of the lower jaw, a mandibular bow member, means for attaching said member to the lower jaw, whereby said member will move with the operative movement of said lower jaw, two axis locator pins, separate adjustable means carried by said bow member and operatively supporting said respective pins on opposite sides of the jaw and in the regions of the respective condyles thereof, two pairs of spaced indicating members, one on each side of the jaw, the members of each of said pairs laterally flanking one of said pins, each of said indicating members having thereon an axis indicating marking, separate adjustable supporting means for said respective indicating members, each of said pins being adjustably movable to a position at which the opposite ends thereof are in longitudinal alignment with the adjacent condyle axis, each of said pairs of indicating members being adjustably movable to positions at which their respective indicating marks are in longitudinal alignment with the adjacent pin when the latter is in said position of longitudinal alignment with the adjacent condyle axis.

3. In a dental apparatus for indicating the condyle axis on a side of the lower jaw, a mandibular bow member, a lower bite supporting member supporting said mandibular bow member, whereby the latter member will move with the operative movement of said lower jaw, a maxillary bow member, an upper bite supporting member adapted for coactive engagement with said lower bite supporting member and supporting said maxillary bow member, an axis locator pin adjustably carried by said mandibular bow member and positioned on a side of said jaw in the region of the condyle thereof, a pair of spaced axis indicating members adjustably carried by said maxillary bow member and laterally flanking said pin, each of said indicating members having thereon an axis indicating marking, said pin being adjustably movable to a position at which the opposite ends thereof are in longitudinal alignment with said condyle axis, said indicating members being adjustably movable to positions at which their said respective indicating markings are in longitudinal alignment with said pin when the latter is in said position of longitudinal alignment with the condyle axis.

4. In a dental apparatus for indicating the condyle axis on the opposite sides of the lower jaw, a mandibular bow member, a lower bite supporting member supporting said mandibular bow member, whereby the latter member will move with the operative movement of said lower jaw, a maxillary bow member, an upper bite supporting member adapted for coactive engagement with said lower bite supporting member and supporting said maxillary bow member, two axis locator pins adjustably carried by said mandibular bow member and positioned on opposite sides of the jaw and in the regions of the respective condyles thereof, two pairs of spaced indicating members adjustably carried by said maxillary bow member and positioned, respectively, on opposite sides of the jaw, the members of each of said pairs laterally flanking one of said pins, each of said indicating members having thereon an axis indicating marking, each of said pins being adjustably movable to a position at which the opposite ends thereof are in longitudinal alignment with the adjacent condyle axis, each of said pairs of indicating members being adjustably movable to positions at which the respective indicating marks are in longitudinal alignment with the adjacent pin when the latter is in said position of longitudinal alignment with the adjacent condyle axis.

5. In a dental apparatus for indicating the condyle axis on a side of the lower jaw, a mandibular bow member having a crossbar adapted for positioning in front of the jaw, an arm adjustably carried by said crossbar and extending rearwardly therefrom and positioned in lateral spaced relation to said jaw, the rear portion of said arm being in the region of the condyle of the jaw, coupling means on said crossbar adjustably supporting said arm for forward, rearward and lateral movement relative to said crossbar, a lower bite supporting member, clamping means on said latter member adjustably supporting said crossbar, whereby the operative pivotal movement of said jaw will cause said crossbar and arm to move, an axis locator pin carried by the rear portion of said arm in a position substantially parallel to said crossbar, a pair of spaced indicating members laterally flanking said pin, each of said indicating members having thereon an axis indicating marking, adjustable supporting means for said indicating members, said pin being adjustably movable by the operative manipulation of said coupling means to a position at which the opposite ends of the pin are in a longitudinal alignment with said condyle axis, said indicating members being adjustably movable by the operative manipulation of said adjustable supporting means to positions at which their said respective indicating markings are congruent with the opposite ends of said pin when the latter is in said position of longitudinal alignment with the condyle axis.

6. In a dental apparatus for indicating the condyle axis on a side of the lower jaw, the combination according to claim 5, said coupling means being adjustably movable along said crossbar, said arm being slidably supported by said coupling means, locking means for releasably securing said coupling means to said crossbar, and locking means for releasably securing said arm to said coupling means.

7. In a dental apparatus for indicating the condyle axis on a side of the lower jaw, the combination according to claim 5, said coupling means being adjustably movable along said crossbar, said arm being adjustably supported by said coupling means for forward and rearward movement, said arm having at the rear thereof a pivotally mounted ramus adjustably movable upwardly and downwardly, the rear portion of said ramus carrying said pin.

8. In a dental apparatus for indicating the condyle axis on a side of the lower jaw, the combination according to claim 5, said coupling means being adjustably movable along said crossbar, said arm being adjustably supported by said coupling means for forward and rearward movement, said arm having at the rear thereof a pivotally mounted ramus adjustably movable upwardly and downwardly, said pin being slidably supported by said ramus, and locking means for releasably securing said pin to said ramus in a selected position.

9. In a dental apparatus for indicating the condyle axis on the opposite sides of the lower jaw, a mandibular bow member having a crossbar adapted for positioning in front of the jaw, two arms adjustably carried by said crossbar on opposite sides thereof and extending rearwardly therefrom in lateral spaced relation to the respective opposite sides of the jaw, the rear portion of each of said arms being in the region of the adjacent condyle of the jaw, separate coupling means on said crossbar adjustably supporting said respective arms for forward, rearward and lateral movement relative to said crossbar, a lower bite supporting member, clamping means on said latter member adjustably supporting said crossbar, whereby the operative pivotal movement of said jaw will cause said crossbar and arms to move, an axis locator pin carried by the rear portion of each of said arms in a position substantially parallel to said crossbar, two pairs of spaced indicating members, one on each side of the jaw, the members of each of said pairs laterally flanking one of said pins, each of said indicating members having thereon an axis indicating marking, adjustable supporting means for said indicating members, said pins being adjustably movable by the operative manipulation of said respective coupling means to positions at which the opposite ends of the respective pins are in longitudinal alignment with the respective condyle axes, said indicating members being adjustably movable by the operative manipulation of said adjustable supporting means to positions at which their said respective indicating markings are congruent with the opposite ends of said respective pins when the latter are in their said respective positions of longitudinal alignment with the respective condyle axes.

10. In a dental apparatus for indicating the condyle axis on a side of the lower jaw, a mandibular bow member, means for attaching said member to the lower jaw, whereby said member will move with the operative movement of said lower jaw, an axis locator pin, adjustable means carried by said bow member and operatively supporting said pin on a side of said jaw in the region of the condyle thereof, adjustable supporting means for said indicating members, said pin being adjustably movable to a position at which the opposite ends thereof are in longitudinal alignment with said condyle axis, a maxillary bow member having a cross bar adapted for positioning in front of the jaw, two arms adjustably carried by said crossbar at one side thereof and extending rearwardly therefrom and in flanking relation to said adjustable means carried by said mandibular bow member, an axis indicating plate supported at the rear of each of said arms, said plates flanking said pin, each of said plates having thereon an axis indicating marking, separate coupling means on said crossbar adjustably supporting said respective arms for forward, rearward and lateral movement relative to said crossbar, an upper bite supporting member, clamping means on said latter member adjustably supporting said crossbar, said axis indicating plates being adjustably movable to positions at which their said respective indicating markings are congruent with the opposite ends of said pin when the latter is in said position of longtiudinal alignment with the condyle axis.

11. In a dental apparatus for indicating the condyle axis on a side of the lower jaw, the combination according to claim 10, said respective coupling means being adjustably movable along said crossbar, said arms being slidably supported by said respective coupling means, locking means for releasably securing said coupling means to said crossbar, and locking means for releasably securing said arms to said respective coupling means.

12. In a dental apparatus for indicating the condyle axis on a side of the lower jaw, the combination according to claim 10, said respective coupling means being adjustably movable along said crossbar, said arms being slidably supported by said respective coupling means for forward and rearward movement, each of said arms having at the rear thereof a pivotally mounted ramus adjustably movable upwardly and downwardly, each of said ramus members carrying one of said plates.

13. In a dental apparatus for indicating the condyle axis on a side of the lower jaw, the combination according to claim 10, said respective coupling means being adjustably movable along said crossbar, said arms being slidably supported by said respective coupling means, each of said arms removably supporting one of said plates.

14. In a dental apparatus for indicating the condyle axis on a side of the lower jaw, the combination according to claim 10, said respective coupling means being adjustably movable along said crossbar, said arms being slidably supported by said respective coupling means, each of said arms revolvably supporting one of said plates about an axis extending longitudinally of the arm.

15. In a dental apparatus for indicating the condyle axis on a side of the lower jaw, the combination according to claim 10, said plates having reflecting surfaces facing said pin.

16. In a dental apparatus for indicating the condyle axis on a side of the lower jaw, the combination according to claim 10, said plates each having a minute apertured portion constituting said axis indicating marking.

References Cited in the file of this patent

UNITED STATES PATENTS

| | | |
|---|---|---|
| 1,052,806 | Evans | Feb. 11, 1913 |
| 1,070,123 | Evans | Aug. 12, 1913 |
| 2,455,451 | Tully | Dec. 7, 1948 |
| 2,814,876 | Stuart | Dec. 3, 1957 |